United States Patent [19]

Srini

[11] Patent Number: 5,053,942
[45] Date of Patent: Oct. 1, 1991

[54] BIT-SLICED CROSS-CONNECT CHIP HAVING A TREE TOPOLOGY OF ARBITRATION CELLS FOR CONNECTING MEMORY MODULES TO PROCESSORS IN A MULTIPROCESSOR SYSTEM

[75] Inventor: Vason P. Srini, Berkeley, Calif.

[73] Assignee: The Regents of the University of California, Berkeley, Calif.

[21] Appl. No.: 265,546

[22] Filed: Nov. 1, 1988

[51] Int. Cl.[5] .................. G06F 13/00; G06F 13/18; G06F 13/364; G06F 12/00

[52] U.S. Cl. .................. 364/200; 364/228.3; 364/229; 364/229.4; 364/229.41; 364/238.1; 364/238.4; 364/240.7; 364/242.6; 364/242.7; 364/242.9; 364/242.91; 364/243; 364/246; 364/252

[58] Field of Search ... 364/200 MS File, 900 MS File; 370/1, 24, 34, 41, 49.5, 53, 69.1, 77, 119

[56] References Cited

U.S. PATENT DOCUMENTS

| | | |
|---|---|---|
| 4,207,609 | 6/1980 | Luiz et al. ................ 364/200 |
| 4,363,096 | 12/1982 | Comfort et al. ............ 364/200 |
| 4,374,413 | 2/1983 | Comfort et al. ............ 364/200 |
| 4,374,414 | 2/1983 | Comfort et al. ............ 364/200 |
| 4,834,483 | 5/1989 | Arthurs et al. ............ 350/96.16 |
| 4,920,484 | 4/1990 | Ranade ..................... 364/200 |

OTHER PUBLICATIONS

M. Valencia et al. "Asynchronous Modular Arbiter", IEEE Transactions on Computers, vol. C-35, No. 1 (Jan. '86); pp. 67–70.

Primary Examiner—Thomas C. Lee
Assistant Examiner—Robert B. Harrell
Attorney, Agent, or Firm—McCubbrey, Bartels, Meyer & Ward

[57] ABSTRACT

A cross-connect circuit for coupling each of a plurality of processors to a memory module selected from a plurality of such modules, provided the module in question has not been identified for connection to another of the processors is disclosed. The circuit is preferably organized as a bit-sliced chip. The connections made by the cross-connect circuit can be changed after each memory cycle.

7 Claims, 7 Drawing Sheets

BIT-SLICED CROSS-CONNECT CHIP HAVING A TREE TOPOLOGY OF ARBITRATION CELLS FOR CONNECTING MEMORY MODULES TO PROCESSORS IN A MULTIPROCESSOR SYSTEM

BACKGROUND OF THE INVENTION

The present invention relates to multiprocessor computer systems and more particularly to an improved cross-connect circuit for connecting the various processors to memory modules which are shared by said processors.

One of the key components of a high performance multiprocessor system is the interconnection network between the processors and the memory. The bandwidth and latency of the interconnection network are two factors that influence the performance of the multiprocessor system. For example, doubling the data path width between the processor and the memory can potentially double the data available to a processor in a memory read. This can result in fewer memory references, fewer conflicts, and hence, increased performance. Reducing the latency in the interconnection network reduces the memory access time which can in turn improve the performance of the system.

Cross-connect systems have been in use in prior art computer systems for connecting the processors to the memory modules that make up the processor memory. In such systems, a processor wishing to execute an instruction that references a particular memory location requests a connection to the memory module containing the memory location in question. The cross-connect then connects the processor to the memory module, provided the memory module in question is not already connected to another processor. The frequency of such connection requests depends, in general, on the type of code being executed. For example, programs written in Pascal or C exhibit a local characteristic that minimizes the number of connection requests to be made. That is, the next instruction to be executed tends to reference memory locations close to those referenced by the last instruction. Hence, delays in performing the connection are acceptable, since the number of connections is small compared to the number of instructions executed.

Programs written in other languages such as Prolog do not share this locality trait. As a result, a processor's memory references may change from memory module to memory module in adjacent memory cycles. In such systems, delays due to low bandwidth in the cross-connect or long latency times after a connection request are unacceptable. Hence, prior art cross-connect have been found to be unsatisfactory for use in these systems.

For example, prior art chip designs that employ multi-stage cross-connect systems are known to the art (M. A. Franklin, D. F. Wann, and W. J. Thomas, "Pin Limitations and Partitioning of VLSI Interconnection Networks," IEEE Transactions on Computers Vol. C-31, No. 11, November 1982, and D. F. Wann and M. A. Franklin, J. Calvo, J. I. Acha, and M. Valencia, "Asynchronous Modular Arbiter," IEEE Transactions on Computers Volume C-35, No. 1, January 1986). However, the latency time of such systems is too long for such systems to be usable in computer systems which may require cross-connects to be made before every memory cycle.

Cross-connect chips with low latency times have been provided as a means of coupling the individual processors in a multiprocessor system to each other. For example, a 16×16 crossbar chip is utilized in the MARS system for connecting processors to each other (P. Agrawal, et al., "MARS: A Multiprocessor-based Programmable Accelerator," IEEE Design & Test of Computers Vol. 5, No. 4, pp 28-36, October 1987). Unfortunately, the arbiter used in the chip is based on positional priority. That is, when two processors request connection to the same memory module at the same time, one of the processors will always have priority over the other, since the processor priorities are assigned to each processor in advance based on the processor's address. In a cross-connect system for use in multiprocessor systems optimized for logic programs such as the Prolog programs mentioned above, all processors must have equal priority for optimum throughput. Hence, such cross-connect chips are unsatisfactory for use in such multiprocessor systems.

Broadly, it is an object of the present invention to provide an improved cross-connect chip for use in connecting the processors of a multiprocessor computer system to the memory modules thereof.

It is another object of the present invention to provide a cross-connect chip which has a low latency time.

It is yet another object of the present invention to provide a cross-connect chip which may be used to construct a cross-connect having an arbitrary bandwidth.

It is still another object of the present invention to provide a cross-connect chip having an arbiter which gives all processors equal priority in making any given cross-connect.

These and other objects of the present invention will become apparent to those skilled in the computer arts from the following detailed description of the invention and the accompanying drawings.

SUMMARY OF THE INVENTION

Figure 1:
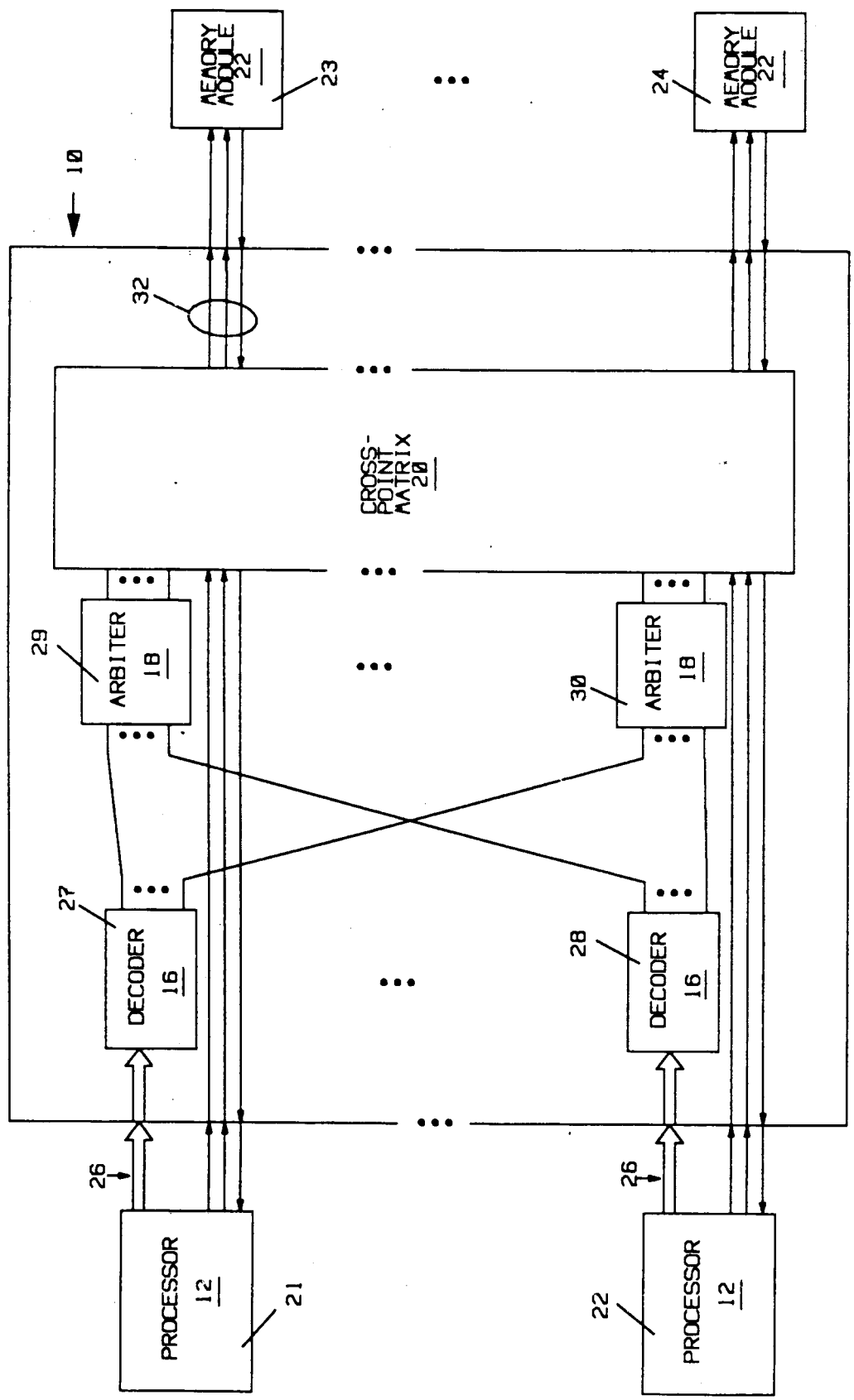
FIG. 1 is a block diagram of a crossbar chip according to the present invention.

The present invention comprises a cross-connect circuit for coupling each of a plurality of processors to a module selected from a plurality of said modules, provided the module in question has not been identified for connection to another of said processors. The modules in question are preferably memory modules. The cross-connect circuit of the present invention comprises a plurality of input ports, one said input port corresponding to each processor, and a plurality of output ports, one said output port corresponding to each said module. Each said input port comprises a means for connecting a said processor to said cross-connect circuit, a means for receiving a module address specifying a said module, a means for receiving an address bit to be communicated to the said module specified by said module address, a means for receiving a data bit to be transmitted to the said module specified by said module address, and a means for transmitting a data bit to be received by the said processor connected thereto. Each said output port comprises a means for connecting said cross-connect circuit to a said memory module, a means for transmitting an address bit to be communicated to the said module specified by said module address, a means for transmitting a data bit to be received by the said module connected thereto, and a means for receiving a data bit from the module connected thereto. The cross-connect circuit also includes a plurality of arbiter circuits for assigning each said module to a processor, one said arbiter circuit corresponding to each said module, each said arbiter circuit being connected to each said module address receiving means and being responsive to the module address received by said module address receiving means, wherein when more than one port receives the same module address, the arbiter circuit corresponding to said module address selects one of said ports for connection to the said module specified by said module address. The cross-connect circuit further includes a cross-connect matrix for connecting each said input port to each said output port, the said input and output ports connected at any given time being determined by said arbiter circuits.

DETAILED DESCRIPTION OF THE INVENTION

The preferred embodiment of a cross-connect system according to the present invention connects any of a plurality of processors to a memory module chosen from a plurality of memory modules. The purposes of clarity, the preferred embodiment will be described with reference to a crossbar chip for connecting any of the 16 processors to any of the 32 memory modules in a multiprocessor system in which the connections in question must be changed at each memory cycle. However, it will be apparent to those skilled in the art that a crossbar chip for connecting different numbers of processors and memory modules may be constructed according to the teachings of the present invention.

The preferred embodiment of the present invention comprises a single bit-slice 16×32 crossbar chip containing 242 signal pins. Thirty-three such chips can be combined to provide an interface between the 16 processors and the 32 memory modules in question. Each of the first 32 chips is used to communicate one bit of a 32-bit address and one bit of a 32-bit data word to be read or written at the address in question between each processor and a memory module specified by said processor. The 33rd chip issued to communicate the read/write signals, a strobe signal, and an acknowledgment signal, discussed below, to the memory modules.

Each processor supplies a 5-bit module address to the crossbar chip. The module address specifies which of the 32 memory modules is to be connected to the processor in question. The address within the module and the data to be communicated are specified on separate pins. Each memory module receives an address and data signals on separate pins from a crossbar chip and supplies data to the chip for a memory read on a separate pin. The use of separate pins for these functions simplifies the circuitry and reduces noise.

If two or more processors address the same memory module, one of them will be selected by the chip and the processor will receive an acknowledgment signal from the memory module if it is not busy (i.e. if it is not doing a refresh or doing error correction). The acknowledgment is transmitted via the 33rd chip described above. The other processors that have requested the memory module in question will not receive the acknowledgment signal. It is the responsibility of these processors to retry the request.

The bit-slice approach to crossbar design can cause word inconsistency problems. To avoid this problem, set and reset pins are included in the chip. These allow all the crossbar chips to be initialized to the same state.

A block diagram of the preferred embodiment of a crossbar chip according to the present invention is shown in FIG. 1 at 10. Crossbar chip 10 performs connections between the 16 processors 12 and 32 memory modules 22. The first and 16th said processors 12 are shown at 21 and 22, respectively. Similarly, the first and 32nd memory modules 22 are shown at 23 and 24, respectively. The desired connection is communicated to crossbar chip 10 by each processor 12 over a bus 26 in the form of a 5-bit module address. The module address is decoded by a decoder 16. There are 16 such decoders in crossbar chip 10, the first and last said decoders being shown at 27 and 28, respectively. Each decoder 16 converts the 5-bit address in question to a signal on one of 32 output lines. The decoders 16 will be discussed in more detail below.

Each output line from each decoder is connected to a different arbiter 18. There is one such arbiter for each memory module 22. The first and 32nd said arbiters are shown at 29 and 30, respectively. The arbiters prevent two processors from simultaneously being connected to a given memory module 22. If two processors 12 request the same memory module, the arbiter associated with that memory module assigns the memory module to one of them. The manner in which these arbiter circuits operate will be discussed in more detail below.

The output of each arbiter controls a set of switches in a crosspoint matrix 20. Crosspoint matrix 20 makes the actual connections between each processor 12 and the memory module 22 requested thereby. The connections in question are made on three lines shown at 32. One of these lines is used to communicate one bit of an address specifying a data word in module 22. The other two lines are used to communicate one bit of the data word stored at the address in question, one for reading the bit from the memory module and one for writing the bit thereto.

Figure 2:
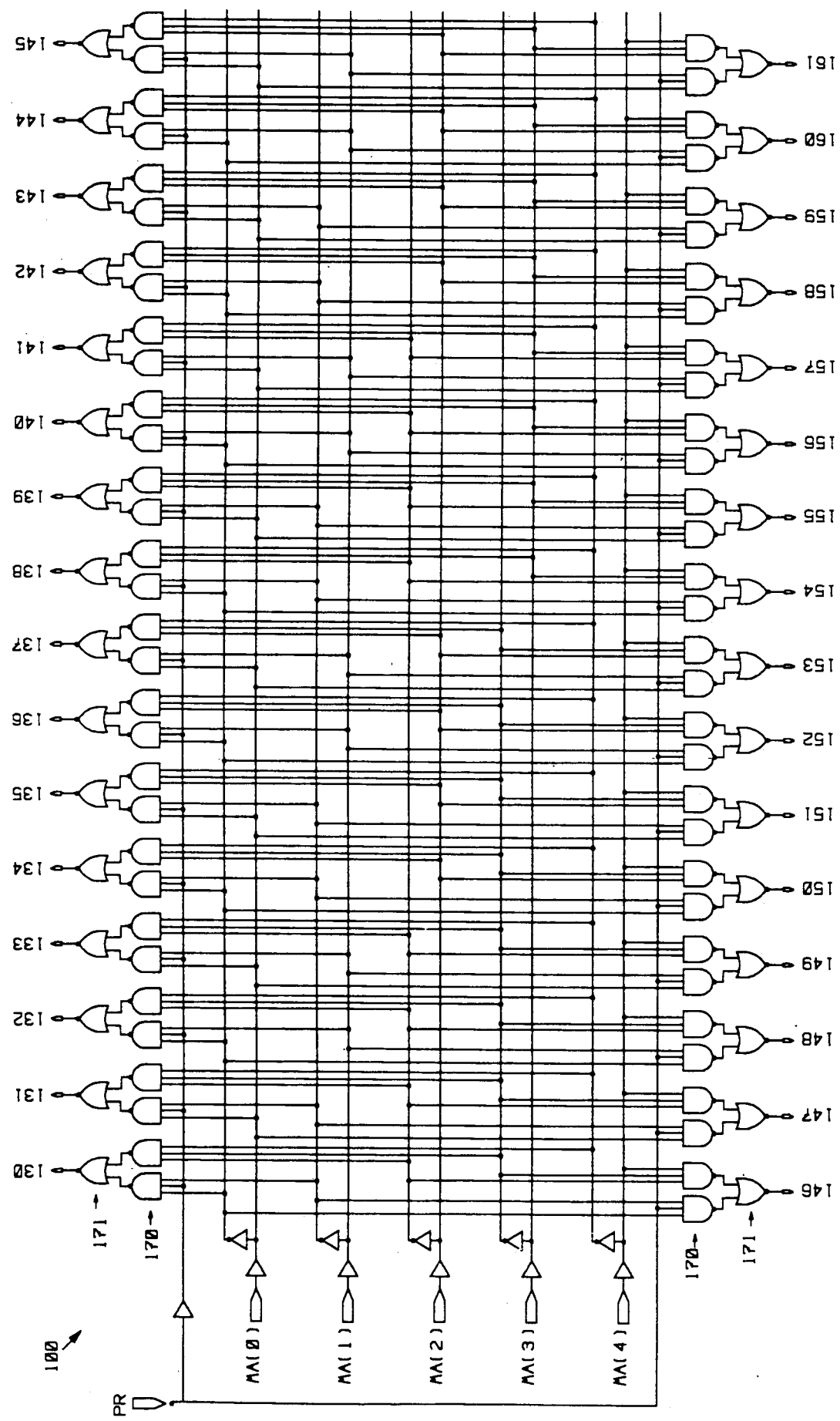
FIG. 2 is a schematic diagram of the preferred embodiment of a decoder circuit according to the present invention.

As noted above, each processor communicates an address specifying a memory module to be connected to the crossbar chip. In the 16 processor by 32 memory module embodiment of a cross-connect discussed above, each crossbar chip includes sixteen 5 input to 32 output decoders on each chip. A schematic diagram of one of these decoders is shown in FIG. 2 at 100. Decoder 100 receives a 5-bit memory module address on lines MA(0)–MA(4) and a processor request signal PR from the processor connected thereto. At most one of the outputs 130–161 of decoder 100 will be high. This output indicates the memory module requested by the processor connected to it.

Decoder 100 uses two levels of gates to reduce the delay therethrough. The first level 170 consists of 3 input NAND gates. The second level 171 consists NOR gates. This design has significantly less delay than simpler designs which utilize a single level of 6-input AND gates, each being constructed from a 6-input NAND gate and an inverter. If the 2 micron CMOS technology available in 1988 is used, the nominal delay through a 6-input NAND gate for a load of 0.2 pf is typically 6.5 ns and the delay through an inverter is typically 1.0 ns. In comparison, the nominal delay through a 3-input NAND gate for a load of 0.2 pf is typically 2.5 ns and the delay through a 2-input NOR gate is typically 2.0 ns. Hence, the two-level design of the present invention has a delay of 4.5 ns compared to 7.5 ns for a one level design.

As noted above, a crossbar chip according to the present invention also includes one arbiter for each memory module. If two or more processors request the same memory module in a cycle, the arbiter selects one. The arbiter must be impartial in the sense that it gives equal priority to the processors requesting the memory module. One advantage of the present invention is that no single processor can dominate a memory module while others are waiting for the same module. Although arbiters are known to the prior art (R. C. Pearce, J. A. Field, and W. S. Little, "Asynchronous Arbiter Module," IEEE Transactions on Computers Vol. C-24, No. 9, pp 931-932, September 1975; W. W. Plummer, "Asychronous Arbiters," IEEE Transactions on Computer Vol. C-21, No. 1, pp 37-42, January 1972; and D. F. Wann and M. A. Franklin, J. Calvo, J. I. Acha, and M. Valencia, "Asynchronous Modular Arbiter," IEEE Transactions on Computers Volume C-35, No. 1, January 1986), they are asynchronous in design and base their priority setting (positional priority, round-robin, or FIFO) on criteria that are not suitable for multiprocessor systems designed to execute Prolog or similarly generated programs.

Figure 3:
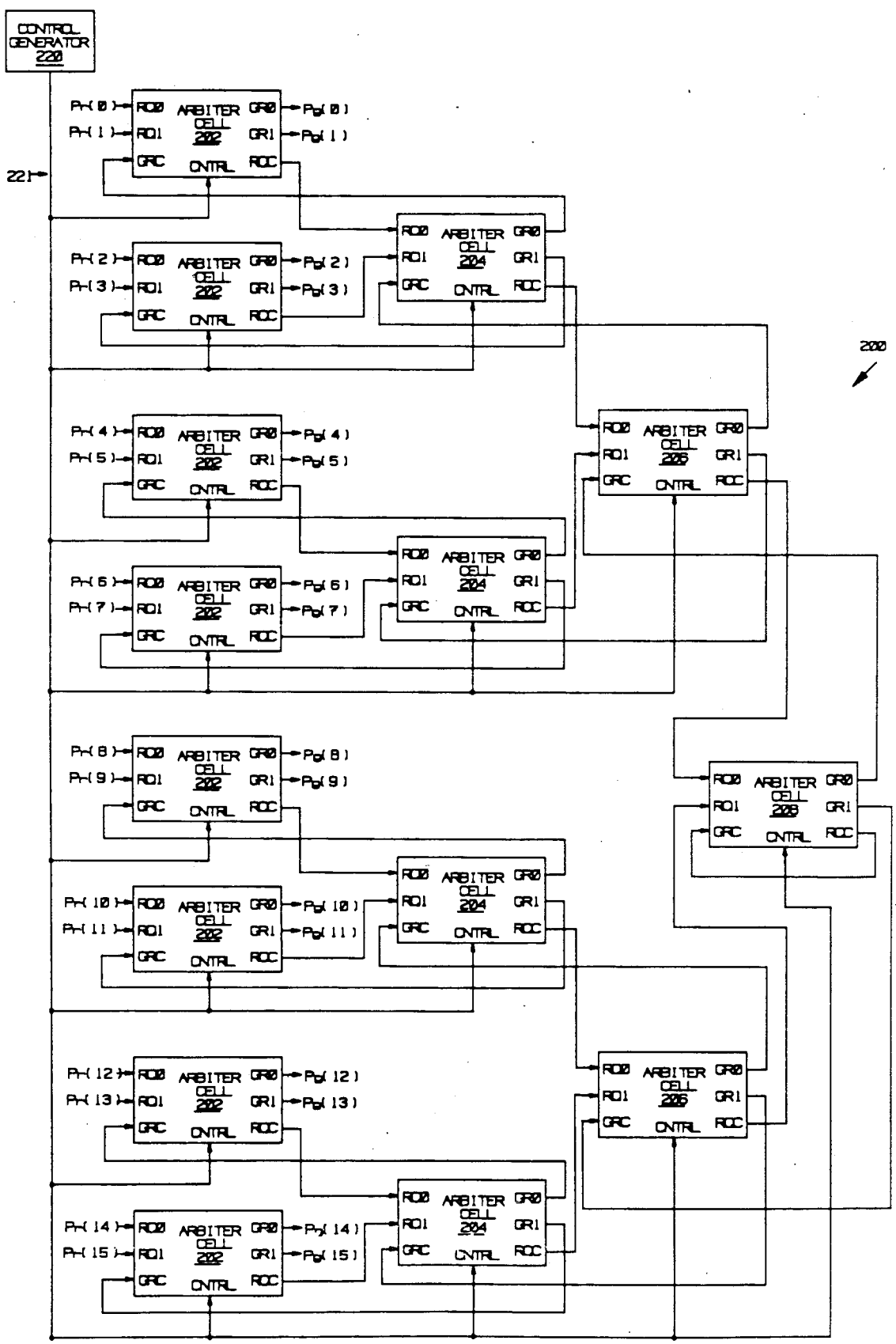
FIG. 3 is a block diagram of an arbiter circuit according to the present invention.

In the preferred embodiment of the present invention, there are 16 processors that can simultaneously generate memory requests to the same module; hence, each memory module requires a one-of-sixteen arbiter. The arbiter is constructed as a tree of one-of-two arbiters employing a synchronous scheme. A block diagram of an arbiter according to the present invention is shown in FIG. 3 at 200. The sixteen requests to arbiter 200, Pr(0)-Pr(15), are received at the leaf level nodes of the tree, which is constructed from 8 one-of-two arbiter cells 202. Each of the one-of-two arbiters 202 at this level communicates a signal on a request chain (RQC) output to an arbiter cell 204 in the second level of the tree. At each level below the root node of the tree, the RQC outputs are the inputs to the arbiters at the next level of the tree. The outputs of the second level of the tree form the inputs to the third level which is constructed from arbiter cells 206. The root node of the tree is constructed from a single arbiter cell 208. Although the arbiter cells in different levels of the tree have been given different numbers in the diagram, it is to be understood that the arbiters are identical in construction.

The arbiter cells are controlled by signals on a bus 221 which are generated by control signal generator 220. The control signals include clock signals and signals used to set and reset the state of the arbiter cells.

Figure 4:
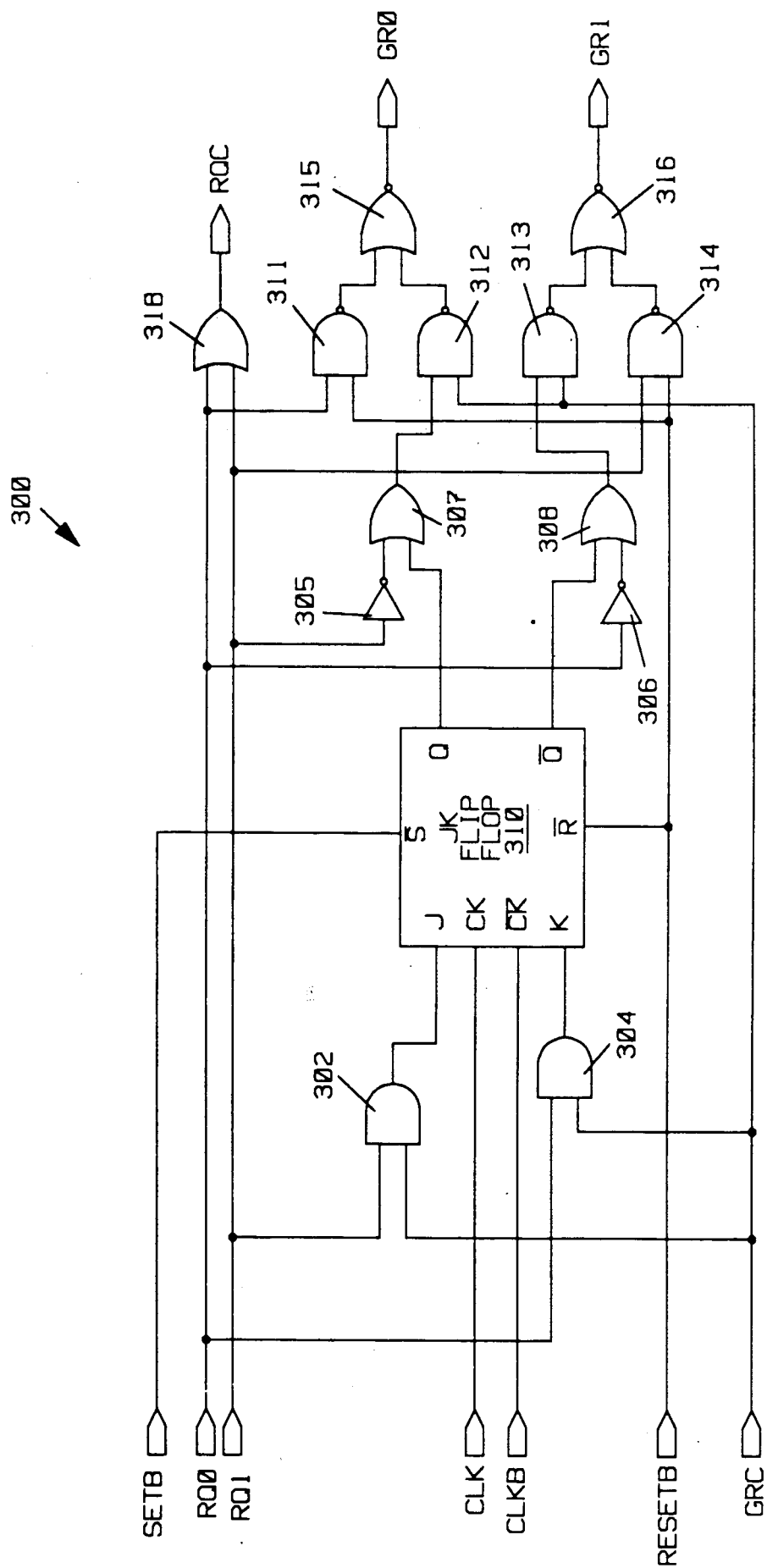
FIG. 4 is a schematic drawing of a one-of-two arbiter cell according to the present invention that utilizes a J-K flip-flop.

The state transition table of the arbiter cells 202, 204, 206, and 208 is shown in Table 1. The preferred embodiment of an arbiter cell according to the present invention is shown in FIG. 4 at 300. Arbiter cell 300 is implemented as a Mealy Machine using J-K flip-flop 310.

The two state finite state machine changes state to 0 after granting a request on GR0 and to 1 after granting a request on GR1. In state 0, RQ1 is preferred and in state 1, RQ0 is preferred if both RQ0 and RQ1 are one. If RESETB is active the outputs are zero and the next state is 0.

The logic equation for J and K inputs of the flip-flop are:

$$J = GRC*RQ1$$

$$K = GRC*RQ0.$$

These equations are implemented using AND gate 302 and AND gate 304.

The logic equation for the output GR0 is:

$$RQ0*GRC*(Q + \overline{RQ1})*RESETB$$

The logic equation for the output GR1 is:

$$RQ1*GRC*(\overline{Q} + \overline{RQ0})*RESETB$$

These equations are implemented using inverters 305-306, OR gates 307-308, NAND gates 311-314 and NOR gates 315-316. In the above logic equations, "*" denotes an AND operation and "+" denotes an OR operation.

The RQC output will be high if any of the two inputs (RQ0 or RQ1) is high. OR gate 318 is used for this purpose.

The "fairness" of the arbiter is seen by considering the values on the inputs and the state of the J-K flip-flop 310. For example, if both RQ0 and RQ1 are high during successive cycles, then J-K flip-flop 310 will be in state 0 followed by state 1 if GRC is one.

It should be noted that arbiter 300 avoids race conditions. The J-K flip-flop changes state after the falling edge of the clock; hence, there will not be a race condition in the tree arbiter if the cycle ends a few nanoseconds after the falling edge of the clock.

The delay through the one of sixteen tree arbiters 200 is the sum of the time needed for the RQC signals in the arbiter cells to propagate to the root of the tree and for the GRC signal in the root to propagate to the arbiters cells 202. The total delay through arbiter 200 is 12 gate delays. This delay determines the cycle time for read/write operations to the memory.

Figure 5:
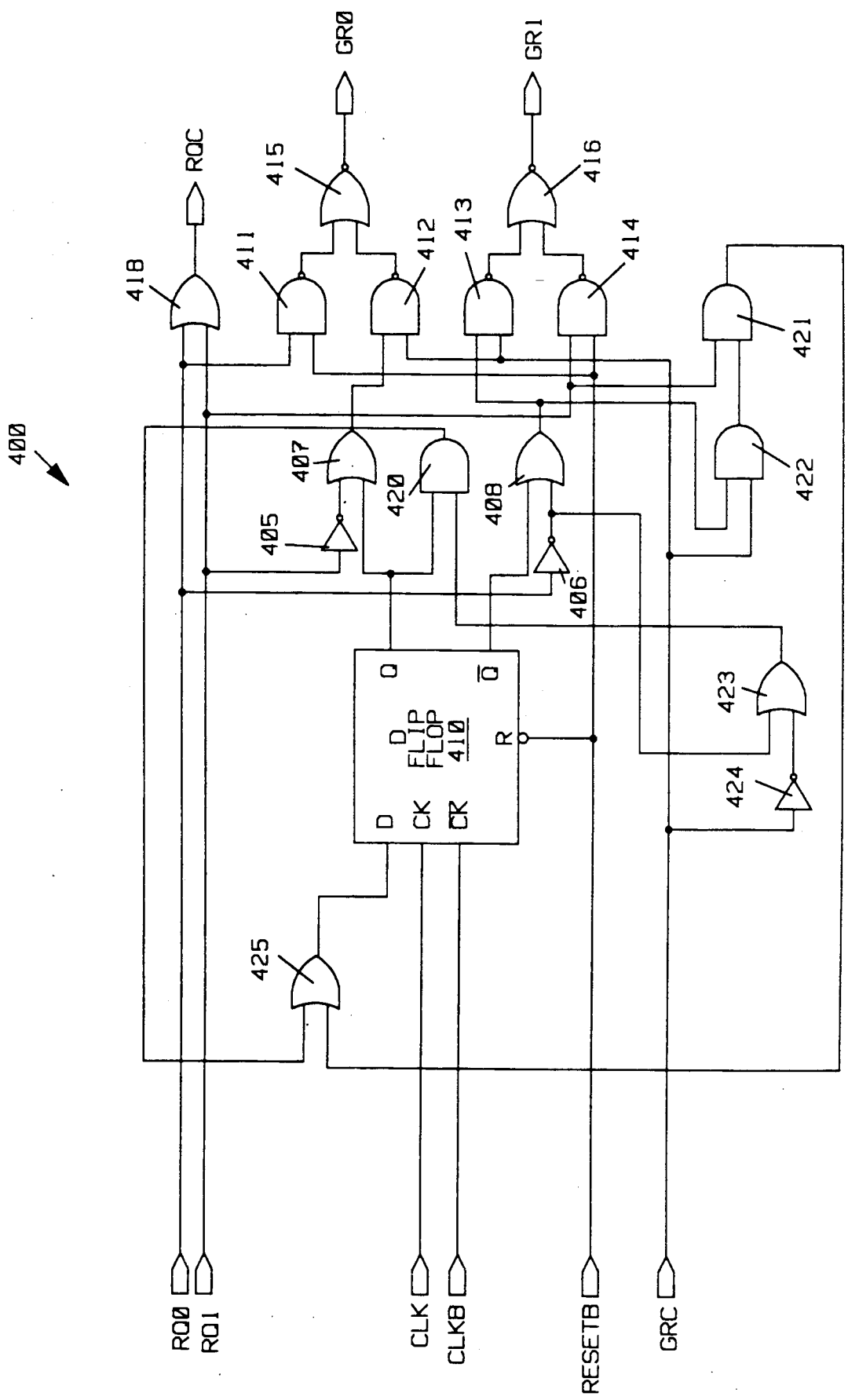
FIG. 5 is a schematic drawing of a one-of-two arbiter cell according to the present invention that utilizes a D flip-flop.

It will be apparent to those skilled in the art that other designs for the one-of-two arbiter cells are possible. For example, a one-of-two arbiter using a D-flip-flop will be apparent. The use of a D-flip-flop reduces the area needed for the arbiter slightly but increases the gate count for design. A one-of-two arbiter cell utilizing a D-flip-flop 410 is shown in FIG. 5 at 400. The logic equation for the D input is given by $$D = Q*(\overline{RQ0} + \overline{GRC}) + (RQ1*GRC*(\overline{RQ0} + Q).$$

This calculation is performed by OR gates 426 and 423, inverter 424, and AND gates 420-422. The circuitry for calculating GR0 and GR1 is the same as that discussed with reference to arbiter cell 300 shown in FIG. 4. The circuit elements for carrying out these calculations are shown with similar numerals.

Figure 6:
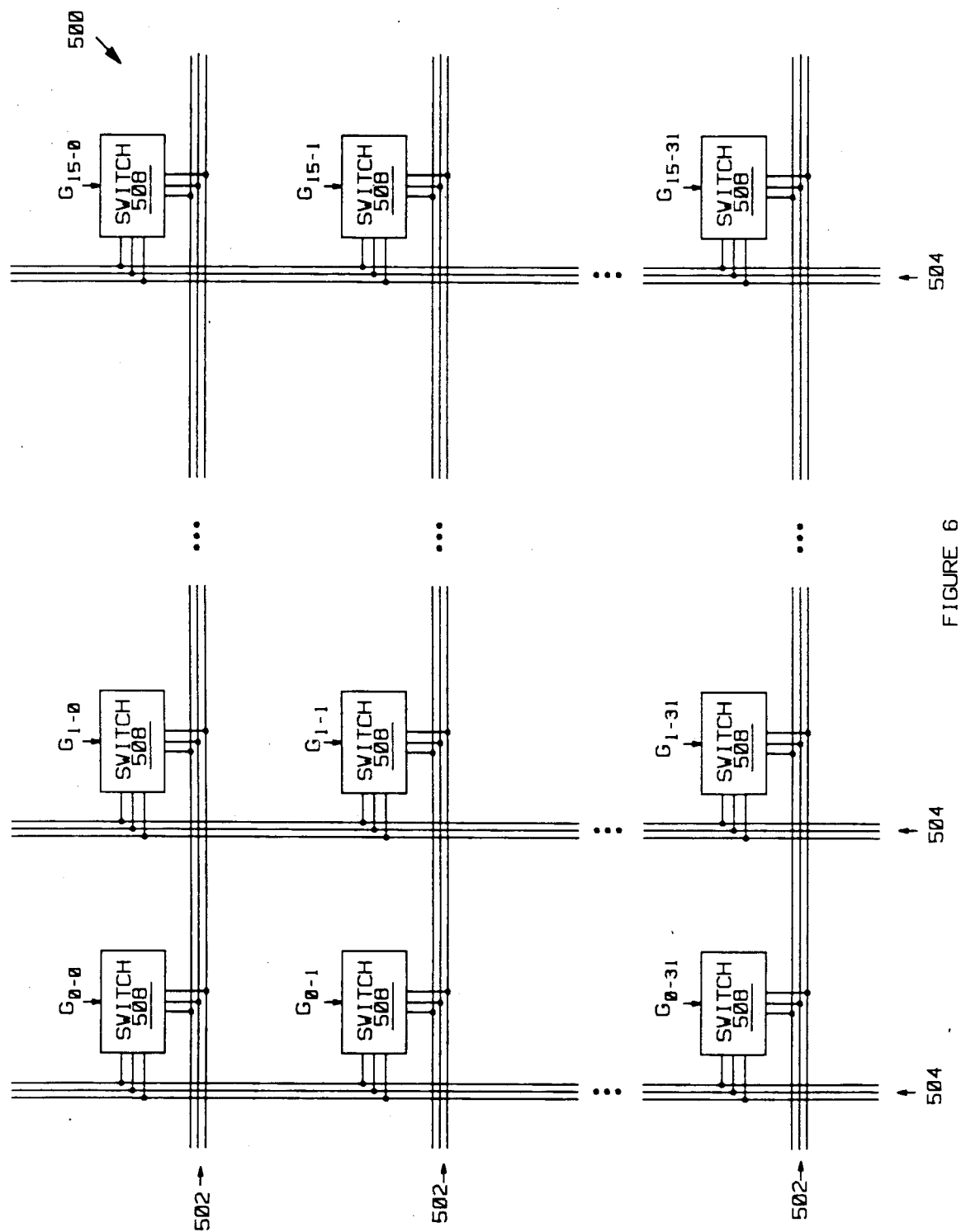
FIG. 6 is block diagram of a crosspoint matrix according to the present invention.

As noted above, once priority has been assigned by the arbiter, the crosspoint matrix on the chip makes the actual connections. The crosspoint matrix connects the 16 processors to the 32 memory modules using 512 "switches". Each switch connects the three lines from the processor to the corresponding three lines of the memory module in question. The first of these three lines transmits one bit of the requested address in the memory module. The second line is used to transmit a bit of a data word to be stored at the address in question. And, the third line is used to receive one bit of the data word stored at the address in question if a read operation is being performed on the memory module in question The preferred embodiment of the crosspoint matrix is shown in FIG. 6 at 500. Crosspoint matrix 500 is organized as 32 rows 502 and 16 columns 504. Each row 502 corresponds to a memory module and consists of the three conductors discussed above. Each column 504 corresponds to a processor and consists of the corresponding three conductors. Each switch 508 is connected to a particular row and column and consists of a combinational logic block which connects the three conductors of the row and column in question when the switch is activated. The Ith switch in the Jth column is controlled by a signal $G_{I,J}$ which is generated by one of the arbiters discussed above. $G_{I,J}$ is the Ith priority granting signal from the arbiter corresponding the Jth memory module.

Figure 7:
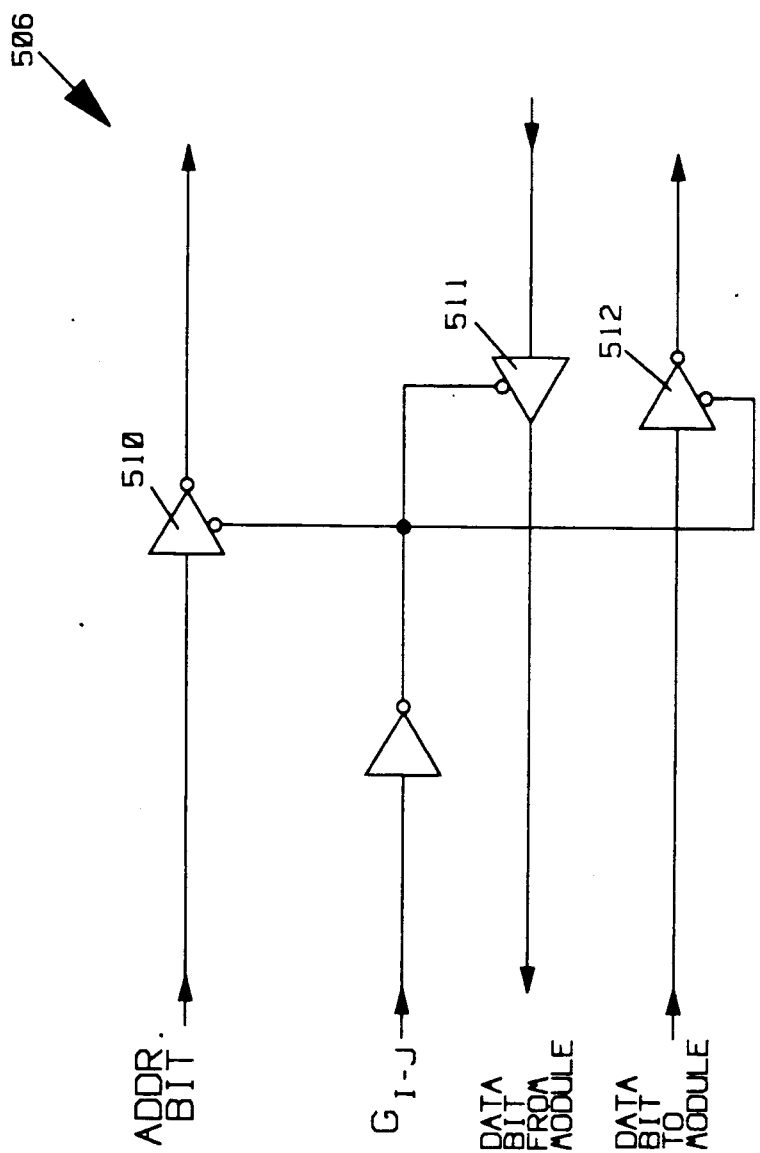
FIG. 7 is a schematic drawing of the switch circuitry shown in FIG. 6.

The preferred embodiment of a switch 506 is shown in FIG. 7. The $G_{I,J}$ signal controls gates 510–512. Gate 510 couples the address bit from the processor to the memory module. Gate 511 couples the data from one bit of the addressed word from the memory module to the processor if a read operation has been selected. Gate 512 couples the data for the bit in question to the memory module if a write operation has been selected.

Although the above description of the preferred embodiment of the present invention has utilized a crossbar chip for connecting processors to memory modules, it will be apparent to those skilled in the art that the crossbar chip of the present invention may be utilized for connecting other types of circuitry to the processors in question.

There has been described herein a novel crossbar chip for connecting a plurality of processors to a plurality of memory modules. Various modifications to the present invention will become apparent to those skilled in the art from the foregoing description and accompanying drawings. Accordingly, the present invention is to be limited solely by the scope of the following claims.

TABLE I

State Transition Table for one of two Arbiter

| Present State | INPUTS | | | Next State | OUTPUTS | | |
|---|---|---|---|---|---|---|---|
| | RQ0 | RQ1 | GRC | | GR0 | GR1 | RQC |
| 0 | 0 | 0 | 0 | 0 | 0 | 0 | 0 |
| 0 | 1 | 0 | 1 | 0 | 1 | 0 | 1 |
| 0 | 1 | 1 | 1 | 1 | 0 | 1 | 1 |
| 0 | — | — | 0 | 0 | 0 | 0 | — |
| 0 | 0 | 0 | 1 | 0 | 0 | 0 | 0 |
| 0 | 0 | 1 | 1 | 1 | 0 | 1 | 1 |
| 1 | 0 | 0 | 0 | 1 | 0 | 0 | 0 |
| 1 | 0 | 1 | 1 | 1 | 0 | 1 | 1 |
| 1 | 1 | 1 | 1 | 0 | 1 | 0 | 1 |
| 1 | — | — | 0 | 1 | 0 | 0 | — |
| 1 | 0 | 0 | 1 | 1 | 0 | 0 | 0 |
| 1 | 1 | 0 | 1 | 0 | 1 | 0 | 1 |

What is claimed is:

1. A cross-connect circuit for coupling each of a plurality of processors to one of a plurality of modules, provided a module in question has not been identified for connection to another one of said processors, said circuit comprising a plurality of input ports, one of said input ports corresponding to each of said processors, and a plurality of output ports, one of said output ports corresponding to each of said modules:

each of said input ports comprising:
  means for connecting one of said processors to said cross-connect circuit;
  means for receiving a module address specifying one of said modules;
  means for receiving an address bit to be communicated to said one of said modules specified by said module address;
  means for receiving a data bit to be transmitted to said one of said modules specified by said module address; and
  means for transmitting a data bit to be received by said one of said processors connected thereto; and each of said output ports comprising:
  means for connecting said cross-connect circuit to said one of said modules specified by said module address;
  means for transmitting an address bit to be communicated to said one of said modules specified by said module address;
  means for transmitting a data bit to be received by said one of said modules specified by said module address; and
  means for receiving a data bit from said one of said modules connected thereto, said cross-connect circuit further comprising:
  a plurality of arbiter means for assigning each of said modules to one of said processors, wherein each said arbiter means includes a plurality of arbiter cells connected in a tree topology with more than one branch point, one of said arbiter means corresponding to each of said modules, each of said arbiter means being connected to each of said means for receiving a module address and being responsive to said module address received by said means for receiving a module address, wherein when more than one of said input ports receives an identical said module address, said one of said arbiter means corresponding to said module address selects only one of said input ports for connection to said one of said modules specified by said module address; and
  cross-connect matrix means for connecting each of said input ports to each of said output ports, said arbiter means determining which of said input ports and output ports are to be connected at any given time by said cross-connect matrix means.

2. The cross-connect circuit of claim 1 wherein each of said means for receiving a module address further comprise means for decoding said module address, said means for decoding including one decode conductor corresponding to each of said modules and producing a signal on said decode conductor corresponding to a given one of said modules in response to said module address corresponding to said given one of said modules being received by said means for receiving a module address.

3. A cross-connect circuit for coupling each of a plurality of processors to one of a plurality of modules, provided a module in question has not been identified for connection to another one of said processors, said circuit comprising a plurality of input ports, one of said input ports corresponding to each of said processors, and a plurality of output ports, one of said output ports corresponding to each of said modules:

each of said input ports comprising:

means for connecting one of said processors to said cross-connect circuit;

means for receiving a module address specifying one of said modules; said means for receiving a module address comprising means for decoding said module address, said means for decoding including one decode conductor corresponding to each of said modules and producing a signal on said decode conductor corresponding to a given one of said modules in response to said module address corresponding to said given one of said modules being received by said means for receiving a module address, means for receiving an address bit to be communicated to said one of said modules specified by said module address;

means for receiving a data bit to be transmitted to said one of said modules specified by said module address; and means for transmitting a data bit to be received by said one of said processors connected thereto; and each of said output ports comprising:

means for connecting said cross-connect circuit to said one of said modules specified by said module address;

means for transmitting an address bit to be communicated to said one of said modules specified by said module address;

means for transmitting a data bit to be received by said one of said modules specified by said module address; and means for receiving a data bit from said one of said modules connected thereto, said cross-connect circuit further comprising:

a plurality of arbiter means for assigning each of said modules to one of said processors, one of said arbiter means corresponding to each of said modules, each of said arbiter means being connected to each of said means for receiving a module address and being responsive to said module address received by said means for receiving a module address, wherein when more than one of said input ports receives an identical said module address, said one of said arbiter means corresponding to said module address selects only one of said input ports for connection to said one of said modules specified by said module address;

cross-connect matrix means for connecting each of said input ports to each of said output ports, said arbiter means, determining which of said input ports and said output ports are to be connected at any given time by said cross-connect matrix means; and wherein each of said arbiter means comprises a plurality of arbiter cells, each of said arbiter cells comprising:

means for specifying two states, a one and a zero;

first, second, and third input means for receiving a first, second, and third input binary signal, respectively;

first, second, and third output means for transmitting first, second and third output binary signal, respectively, wherein said third output signal is a one if either of said first or second input signals is a one and zero otherwise, and wherein said second and third output signals are given by the following table:

| PRESENT STATE | NEXT STATE | INPUT MEANS | | | OUTPUT MEANS | |
|---|---|---|---|---|---|---|
| | | FIRST | SECOND | THIRD | FIRST | SECOND |
| 0 | 0 | 0 | 0 | 0 | 0 | 0 |
| 0 | 0 | 1 | 0 | 1 | 1 | 0 |
| 0 | 1 | 1 | 1 | 1 | 0 | 1 |
| 0 | 0 | — | — | 0 | 0 | 0 |
| 0 | 0 | 0 | 0 | 1 | 0 | 0 |
| 0 | 1 | 1 | 1 | 0 | 0 | 1 |
| 1 | 1 | 0 | 0 | 0 | 0 | 0 |
| 1 | 1 | 0 | 1 | 1 | 0 | 1 |
| 1 | 0 | 1 | 1 | 1 | 1 | 0 |
| 1 | 1 | — | — | 0 | 0 | 0 |
| 1 | 1 | 0 | 0 | 1 | 0 | 0 |
| 1 | 0 | 1 | 0 | 1 | 1 | 0 | wherein "—" indicates that either one or zero may be present, and wherein said arbiter cells are connected in a tree topology comprising an order sequence of M levels designated as a first level through to an Mth level, inclusive, said first level being the leaf level of said tree, said Mth level comprising one of said arbiter cells and an Ith level comprising twice as many of said arbiter cells as an (I+1)st level, said arbiter cells in said Ith level, for I values from 2 to (M−1), being connected with said first input means of each said arbiter cell connected to said third output means of one of said arbiter cells in an (I−1)st level and said second input means of each said arbiter connected to said third output means of a different one of said arbiter cells in the (I−1)st level, said third input means of each of said arbiter cells being connected to either a said first output means or a said second output means of one of said arbiter cells in said (I+1)st level, said third output means of said one of said arbiter cells comprising said Mth level being connected to said third input means thereof, said first and second input means of said arbiter cells in said first level being connected to different ones of said decode conductors, and said first and second output means of said arbiter cells in said first level being connected to said cross-connect matrix means and determining which connections are made thereby.

4. A cross-connect circuit for coupling each of a plurality of processors to one of a plurality of modules, provided a module in question has not been identified for connection to another one of said processors, said circuit comprising a plurality of input ports, one of said input ports corresponding to each of said processors, and a plurality of output ports, one of said output ports corresponding to each of said modules;

each of said input ports comprising;
means for connecting one of said processors to said cross-connect circuit;
means for receiving a module address specifying one of said modules; said means for receiving a module address comprising means for decoding said module address, said means for decoding including one decode conductor corresponding to each of said modules and producing a signal on said decode conductor corresponding to a given one of said modules in response to said module address corresponding to said given one of said modules being received by said means for receiving a module address,
means for receiving an address bit to be communicated to said one of said modules specified by said module address;
means for receiving a data bit to be transmitted to said one of said modules specified by said module address; and
means for transmitting a data bit to be received by said one of said processors connected thereto; and
each of said output ports comprising:
means for connecting said cross-connect circuit to said one of said modules specified by said module address:
means for transmitting an address bit to be communicated to said one of said modules specified by said module address;
means for transmitting a data bit to be received by said one of said modules specified by said module address; and
means for receiving a data bit from said one of said modules connected thereto,
said cross-connect circuit further comprising:
a plurality of arbiter means for assigning each of said modules to one of said processors, one of said arbiter means corresponding to each of said modules, each of said arbiter means being connected to each of said means for receiving a module address and being responsive to said module address received by said means for receiving a module address, wherein when more than one of said input ports receives an identical said module address, said one of said arbiter means corresponding to said module address selects only one of said input ports for connection to said one of said modules specified by said module address;
cross-connect matrix means for connecting each of said input ports to each of said output ports, said arbiter means determining which of said input ports and said output ports are to be connected at any given time by said cross-connect matrix means; and
wherein each of said arbiter means comprises a plurality of arbiter cells, each of said arbiter cells comprising:
means for specifying two states designated by a binary signal, Q, being a one or a zero;
first, second, third, and fourth input means for receiving binary signals, RQ0, RQ1, GRC, and RESETB, respectively;
first, second, and third output means for transmitting a first, second and third output binary signal, respectively, wherein
said third output signal is a one if either of said first or second input signals is a one and zero otherwise,
said first output signal is determined by a logic equation $$RQ0 * GRC * (Q + \overline{RQ1}) * RESETB$$

wherein said second output signal is determined by a logic equation $$RQ1 * GRC * (\overline{Q} + \overline{RQ0}) * RESETB$$

and wherein said arbiter cells are connected in a tree topology comprising an order sequence of M levels designated as a first level through to an Mth level, inclusive, said first level being the leaf level of said tree, said Mth level comprising one of said arbiter cells and an Ith level comprising twice as many of said arbiter cells as an (I+1)st level,
said arbiter cells in said Ith level, for I values from 2 to (M−1), being connected with said first input means of each said arbiter cell connected to said third output means of one of said arbiter cells in an (I−1)st level and said second input means of each said arbiter connected to said third output means of a different one of said arbiter cells in the (I−1)st level, said third input means of each of said arbiter cells being connected to either a said first output means or a said second output means of one of said arbiter cells in said (I+1)st level,
said third output means of said one of said arbiter cells comprising said Mth level being connected to said third input means thereof,
said first and second input means of said arbiter cells in said first level being connected to different ones of said decode conductors, and
said first and second output means of said arbiter cells in said first level being connected to different ones of said decode conductors, and
said first and second output means of said arbiter cells in said first level being connected to said cross-connect matrix means and determining which connections are made thereby.

5. The cross-connect circuit of claim 4 wherein said means for specifying two states comprises a J-K flip-flop, and wherein each of said arbiter cells further comprises means for applying a first signal to a J input of said J-K flip-flop, said first signal satisfying the logic equation $$J = GRC * RQ1$$

and means for applying a second signal to the K input of said J-K flip-flop, said second signal satisfying a logic equation $$K = GRC * RQ0$$

6. The cross-connect circuit of claim 4 wherein said means for specifying two states comprises a D flip-flop, and wherein each of said arbiter cells further comprises means for applying a signal to D input of said D flip-flop, said signal satisfying a logic equation $$Q * (\overline{RQ0} + \overline{GRC}) + RQ1 * GRC * (\overline{RQ0} + \overline{Q}).$$

7. An arbiter circuit connected to a plurality of input lines and a plurality of output lines, the number of said input lines being equal to the number of said output lines, said circuit providing means for producing a signal on a single one of said output lines in response to one or more signals on said input lines, said arbiter circuit including a plurality of arbiter cells, each of said cells comprising:

means for specifying two states, a one and a zero;

first, second, and third input means for receiving a first, second and third input binary input signals, respectively;

first, second and third output means for transmitting a first, second and third binary output signal, respectively, wherein said third output signal is a one if either of said first or second input signals is a one and zero otherwise, and wherein said first and second output signals are given by the following table:

| PRESENT STATE | NEXT STATE | INPUT MEANS | | | OUTPUT MEANS | |
|---|---|---|---|---|---|---|
| | | FIRST | SECOND | THIRD | FIRST | SECOND |
| 0 | 0 | 0 | 0 | 0 | 0 | 0 |
| 0 | 0 | 1 | 0 | 1 | 1 | 0 |
| 0 | 1 | 1 | 1 | 1 | 0 | 1 |
| 0 | 0 | — | — | 0 | 0 | 0 |
| 0 | 0 | 0 | 0 | 1 | 0 | 0 |
| 0 | 1 | 1 | 1 | 0 | 0 | 1 |
| 1 | 1 | 0 | 0 | 0 | 0 | 0 |
| 1 | 1 | 0 | 1 | 1 | 0 | 1 |
| 1 | 0 | 1 | 1 | 1 | 1 | 0 |
| 1 | 1 | — | — | 0 | 0 | 0 |
| 1 | 1 | 0 | 0 | 1 | 0 | 0 |
| 1 | 0 | 1 | 0 | 1 | 1 | 0 | wherein "—" indicates that either one or zero may be present, and wherein said arbiter cells are connected in a tree topology comprising an order sequence of M levels designated as a first level through to an Mth level, inclusive, said first level being the leaf level of said tree, said Mth level comprising one of said arbiter cells and an Ith level comprising twice as many of said arbiter cells as an (I+1)st level, said arbiter cells in said Ith level, for I values from 2 to (M−1), being connected with said first input means of each said arbiter cell connected to said third output means of one of said arbiter cells in an (I−1)st level and said second input means of each said arbiter connected to said third output means of a different one of said arbiter cells in the (I−1)st level, said third input means of each of said arbiter cells being connected to either a said first output means or a said second output means of one of said arbiter cells in said (I+1)st level, said third output means of said one of said arbiter cells comprising said Mth level being connected to said third input means thereof, said first and second input means of said arbiter cells in said first level being connected to different ones of a plurality of decode conductors, and said first and second output means of said arbiter cells in said first level being connected to different ones of said output lines.

* * * * *

UNITED STATES PATENT AND TRADEMARK OFFICE
CERTIFICATE OF CORRECTION

PATENT NO. : 5,053,942
DATED : October 1, 1991
INVENTOR(S) : Srini

It is certified that error appears in the above-identified patent and that said Letters Patent is hereby corrected as shown below:

Column 12, lines 35-37, delete these lines.

Column 12, line 59, before first "D" insert --the--.

Column 1, line 51, delete "cross-connect" and insert therefor --cross-connects--.

Column 3, line 37, delete "The" and insert therefor --For--.

Column 3, line 65, delete "an".

Column 4, line 67, after "consists" insert --of--.

Column 5, line 26, delete "Computer" and insert therefor -- Computers--.

Column 7, line 22, after "corresponding" insert --to--.

Column 13, line 6, delete "signals" and insert therefor --signal--.

Signed and Sealed this

Fifteenth Day of June, 1993

Attest:

MICHAEL K. KIRK

Attesting Officer

Acting Commissioner of Patents and Trademarks